US008958057B2

(12) United States Patent
Kane et al.

(10) Patent No.: US 8,958,057 B2
(45) Date of Patent: Feb. 17, 2015

(54) CAMERA-STYLE LIDAR SETUP

(75) Inventors: David M. Kane, Tucson, AZ (US); Jeff T. Daiker, Tucson, AZ (US); James T. Murray, Tucson, AZ (US)

(73) Assignee: Arete Associates, Northridge, CA (US)

( * ) Notice: Subject to any disclaimer, the term of this patent is extended or adjusted under 35 U.S.C. 154(b) by 132 days.

(21) Appl. No.: 12/317,771

(22) Filed: Dec. 29, 2008

(65) Prior Publication Data

US 2010/0165322 A1 Jul. 1, 2010

Related U.S. Application Data

(63) Continuation of application No. PCT/US2007/014992, filed on Jun. 26, 2007.

(60) Provisional application No. 60/816,656, filed on Jun. 27, 2006.

(51) Int. Cl.
G01C 3/08 (2006.01)
G01S 17/42 (2006.01)
G01S 7/481 (2006.01)

(52) U.S. Cl.
CPC ........ *G01S 17/42* (2013.01); *G01S 7/481* (2013.01)
USPC ........... 356/4.01; 356/3.01; 356/3.1; 356/4.1; 356/5.01; 356/5.1

(58) Field of Classification Search
CPC ............ G01C 3/08; G01S 17/00; G01S 17/95
USPC ............. 356/3.01–3.15, 4.01–4.1, 5.01–5.15, 356/6–22, 28, 28.5
See application file for complete search history.

(56) References Cited

U.S. PATENT DOCUMENTS

| 4,274,735 | A | 6/1981 | Tamura et al. |
| 4,303,335 | A | 12/1981 | Matsuda et al. |
| 4,518,256 | A | 5/1985 | Schwartz |
| 4,634,272 | A | 1/1987 | Endo et al. |
| 4,926,050 | A | 5/1990 | Shemwell |

(Continued)

FOREIGN PATENT DOCUMENTS

| DE | 3702742 C1 | 6/1988 |
| DE | 19513823 A1 | 10/1996 |
| EP | 1221582 A2 | 7/2002 |

*Primary Examiner* — Luke Ratcliffe
(74) *Attorney, Agent, or Firm* — Furman IP Law (57) ABSTRACT

Separate reception/transmission apertures enhance pointing: reception is more efficient than transmission (kept smaller for MEMS steering). Apparatus aspects of the invention include lidar transmitters emitting laser beams, and scan mirrors (or assemblies) angularly adjustable to deflect the beams in orthogonal directions. In one aspect, afocal optics magnify deflection; a transmitter aperture transmits the beam; a lidar receiver doesn't share the transmitter aperture. In another aspect, auxiliary optics calibrate the deflection.
A method aspect of the invention notices and responds to a remote source—using a similar local laser, adjustable scan mirror or assembly, afocal deflection magnifier, transmission aperture and separate receiver. Method steps include operating the receiver to notice and determine location of the remote source; and controlling the transmitter to direct laser light back toward that location.
Among preferences: receiver aperture exceeds five times transmitter aperture; receiver is segmented; beam expander between laser and mirror(s) controls waist or divergence, for selecting Gaussian or Rayleigh divergence and "zoom".

20 Claims, 4 Drawing Sheets

(56) References Cited

U.S. PATENT DOCUMENTS

| | | |
|---|---|---|
| 5,198,657 A | 3/1993 | Trost et al. |
| 5,214,484 A * | 5/1993 | de Mollerat du Jeu ...... 356/28.5 |
| 5,220,164 A | 6/1993 | Lieber et al. |
| 5,270,780 A * | 12/1993 | Moran et al. ................. 356/5.04 |
| 5,751,830 A | 5/1998 | Hutchison |
| 5,838,239 A * | 11/1998 | Stern et al. .................... 340/583 |
| 6,576,884 B1 | 6/2003 | Ostromek et al. |

* cited by examiner

CAMERA-STYLE LIDAR SETUP

RELATION BACK

This application is a continuation of and claims priority to International Application No. PCT/US2007/014992 filed Jun. 26, 2007 which in turn claims priority from our Provisional Application No. 60/816,656, filed Jun. 27, 2006, both of which are wholly incorporated by reference herein.

In addition this paper is very closely related to our previous lidar-related innovations since 2000. The invention simply aims to achieve somewhat improved bandwidth, noise, sampling rate, and various other optical benefits. Those earlier innovations are represented in patent documents which are also hereby wholly incorporated by reference into this document:

PCT Patent Publication WO2003/098263, with international publication date of Nov. 27, 2003;
PCT Patent Publication WO2004/083795A2, with international publication date of Sep. 30, 2004; and
PCT Patent Application PCT/US2005/028777 filed Aug. 10, 2005.

STATEMENT OF GOVERNMENT SUPPORT

This invention was made with government support under contract N00014-07-C-0367 awarded by the Department of the Navy. The government has certain rights in the invention.

BACKGROUND

The present system maintains the good pointing accuracy of those earlier shared-aperture or shared-beam systems, but by a different strategy as explained below. The aperture- or beam-sharing systems suffer from an intrinsic limitation that the light-transfer efficiency of the system for reception purposes is constrained to be the same as for transmission purposes—whereas the latter is held to the relatively small values appropriate for MEMS beam steering.

Thus the prior art, and even our own earlier efforts to provide uniformly excellent imaging quality with rapid operation, continue to leave some further refinements to be desired.

SUMMARY OF THE DISCLOSURE

The present invention provides just such refinement. In preferred embodiments the invention has several independent aspects or facets, which are advantageously used in conjunction together although they are capable of practice independently.

In its first main facet or aspect, the invention is lidar apparatus. It includes a lidar transmitter having a laser source that produces a laser beam, a scan mirror or scan-mirror assembly angularly adjustable to deflect the beam in at least two orthogonal directions, and an afocal optical unit for magnifying the beam deflection.

In the apparatus, the transmitter has an aperture for transmitting the beam. The apparatus also includes a lidar receiver that does not share the transmitter aperture.

The foregoing may be a definition or description of the first aspect of the invention in its broadest or most general form. Even as thus broadly couched, however, it can be seen that this facet of the invention significantly advances the art.

More specifically, since the receiver and transmitter apertures are different and separated, they can now be of different sizes. This is particularly advantageous when the transmitter aperture is relatively small—being adapted for optical coupling via a rather small beam deflector such as the scan mirror or assembly.

Although the invention even as most broadly or generally described represents a notable improvement, nevertheless it is ideally practiced with certain preferred enhancements or options that provide yet further benefits. For example, preferably the receiver has an aperture that is larger than the transmitter aperture.

Preferably the receiver aperture area is at least five times that of the transmitter aperture. Ideally the receiver is a single unitary module; however, if all constraints cannot be met in this way, then the receiver preferably includes plural receiver modules each having an aperture, and the aggregate aperture area of the plural receiver modules is larger than the area of the transmitter aperture; in this case further preferably the aperture area of each one of the plural receiver modules is larger than the area of the transmitter aperture.

Preferably the apparatus further includes a beam expander, disposed between the laser and the mirror or mirrors, for controlling the beam waist or divergence, or both, particularly at the mirror or mirrors. In this case further preferably the expander is adjustable and enables selection of Gaussian or Rayleigh divergence, to effectively provide a "zoom" function.

Another preference is that the apparatus further include an auxiliary optical system for calibrating the deflection produced by the mirror or mirror assembly. If it does, then there are two subpreferences:

(1) the laser beam follows a particular optical path at the mirror or mirrors, and the auxiliary optical system includes:
  means for causing an auxiliary radiation beam to follow, at the mirror or mirrors, an optical path identical or similar to the particular path, and
  means for monitoring deflection of the auxiliary beam by the mirror or mirrors; and also
(2) the causing means include a beamsplitter for at least roughly aligning the auxiliary beam with the laser beam in approaching the mirror or mirrors.

In the case of this latter subpreference there is a group of related and nested further preferences. Preferably:
  the apparatus further includes some means for separating the auxiliary beam from the laser beam after leaving the mirror or mirrors; and an auxiliary detector for determining deflection of the separated auxiliary beam by the mirror or mirrors;
  the apparatus includes some means for correlating the determined deflection with control signals that operate the mirror or mirrors;
  the separating means include some means for passing the auxiliary beam through the same beamsplitter again, or through another beamsplitter;
  the auxiliary detector is a position-sensing detector ("PSD");
  the beamsplitter is wavelength sensitive; and the auxiliary beam and laser beam are of different wavelengths;
  the beamsplitter is a dichroic element;
  the beamsplitter is a holographic element;
  the apparatus further includes some means for at least roughly synchronizing pulses of the laser beam with sensitive times or dispositions, or both, of the receiver (here it will be understood that the term "disposition" encompasses location or orientation, or both);
  the apparatus further includes one or both of: (a) calculating means for determining time delay between transmission of a pulse of the laser beam and receipt of a reflected return of the pulse from an object, and (b) some comparison means for determining Doppler shift in the laser beam;

the calculating or comparison means further include, respectively: some means for calculating object distance from the determined time delay, or some means for deriving relative speed from the shift;

the apparatus further includes some means for incorporating information about the apparatus orientation or location, or both, together with information that the apparatus has noticed a return from an object, or distance of such an object, or both.

We also have certain other basic preferences: preferably the receiver has a detector of particular overall dimensions, and is controlled actively to select operation as either:

a single unit having said particular overall dimensions, or multiple subsections of the detector, each having dimensions smaller than said particular overall dimensions.

In either of these cases, a sampled region is selected based on knowledge of where the scan mirror is pointing the laser, to facilitate sampling of smaller units.

Preferably the apparatus further includes some means for measuring the angles of beam deflection by the scan mirror or mirror assembly; and the measuring means include:

a capacitive sensor responsive to an individual mirror or mirrors; or a magnetic sensor responsive to an individual mirror or mirrors; or a lookup table calibrated in drive voltage or current supplied to an individual mirror or mirrors.

In its second main facet or aspect, too, the invention is lidar apparatus. It includes a lidar transmitter having a laser source that produces a laser beam, a scan mirror or scan-mirror assembly angularly adjustable to deflect the beam in at least two orthogonal directions; and an auxiliary optical system for calibrating the deflection by the mirror or mirror assembly.

The foregoing may be a definition or description of the second aspect of the invention in its broadest or most general form. Even as thus broadly couched, however, it can be seen that this facet of the invention significantly advances the art.

More specifically, the auxiliary optical train enables closed-loop, real-time calibration of the deflections—so that error in pointing accuracy is virtually eliminated even under many circumstances that might degrade the reliability of precalibration, e.g. at the factory.

Although the invention even as most broadly or generally described represents a notable improvement, nevertheless the invention is ideally practiced with certain preferred enhancements or options that provide even further benefit. For example, given that the laser beam follows a particular optical path at the mirror or mirrors, we prefer that the auxiliary optical system include:

some means for causing an auxiliary radiation beam to follow an identical or similar optical path at the mirror or mirrors, and some means for monitoring deflection of the auxiliary beam by the mirror or mirrors.

In this case it is further preferable that the causing means include a beamsplitter for at least roughly aligning the auxiliary beam with the laser beam in approaching the mirror or mirrors. If this preference is observed, then it is still further preferable that the apparatus also include:

some means for separating the auxiliary beam from the laser beam after leaving the mirror or mirrors; and an auxiliary detector for determining deflection of the separated auxiliary beam by the mirror or mirrors.

If the apparatus does include these elements, then there are three further preferences:

that the apparatus include some means for correlating the determined deflection with control signals that operate the mirror or mirrors, so that the correlated signals provide a calibration of operation of the mirror or mirrors;

that the separating means include some means for passing the auxiliary beam through the same beamsplitter or another beamsplitter; and that the auxiliary detector be a position-sensing detector ("PSD").

A still further preference is that the beamsplitter be wavelength sensitive, and the auxiliary beam and laser beam be of different wavelengths. Yet another is that the beamsplitter be a dichroic element.

In its third main facet or aspect the invention is a method for noticing and responding to a remote light source. The method uses a transmitter that includes a local radiation source that produces a laser beam, a scan mirror or scan-mirror assembly angularly adjustable to deflect the beam in at least two orthogonal directions—and an afocal optical unit for magnifying the beam deflection. The transmitter has an aperture for transmitting the beam; and a radiation receiver that does not share the transmitter aperture.

The method includes the step of operating the receiver to notice and determine a location of the remote source. It also includes the step of controlling the transmitter to direct the laser beam back toward the determined location.

The foregoing may be a definition or description of the third aspect of the invention in its broadest or most general form. Even as thus broadly couched, however, it can be seen that this facet of the invention significantly advances the art.

More specifically, by returning a response beam from the transmitter to the source location, this aspect of the invention takes advantage of both the potentially large-aperture receiver for pinpointing the location, and the relatively smaller-aperture transmitter suited to nimble beam steering with the scan mirror or assembly.

Although the invention even as most broadly or generally described represents a notable improvement, nevertheless the invention is ideally practiced with certain preferred enhancements or options that provide even further benefit. For example, preferably the method further includes the step of activating the receiver to collect and interpret reflected radiation of the back-directed laser beam, received from the location. Another preference is that the method further utilize the step of activating an additional receiver to collect and interpret reflected radiation of the back-directed laser beam, received from the location.

Still another preference is that the first-mentioned receiver and the additional receiver be sensitive in respective different wavelength bands, namely: a first spectral waveband encompassing emissions of expected remote sources including but not necessarily limited to the remote light source; and a second spectral waveband encompassing the laser beam. Yet another preference is that the activating step include using the additional receiver in a lidar operating mode to determine return time of the laser beam and thereby distance of a reflecting object at the location.

All of the foregoing benefits and advantages will be more clearly understood from the detailed description that follows, with reference to the accompanying drawings—of which:

DETAILED DESCRIPTION OF THE PREFERRED EMBODIMENTS

A reflective element or module 3 (FIGS. 1 and 2)—which can be a small, single mirror, or a MEMS scan mirror, or a MEMS scan-mirror array—can be used for projection but not for capturing the reflected beam. As in previous work of Bowker, Lubard and McLean, as well as our own earlier innovations mentioned above, it is possible to accumulate data that give, in effect, a three-dimensional impression of a region by aggregating numerous two-dimensional or flying-spot data elements.

Figures 4, 5:
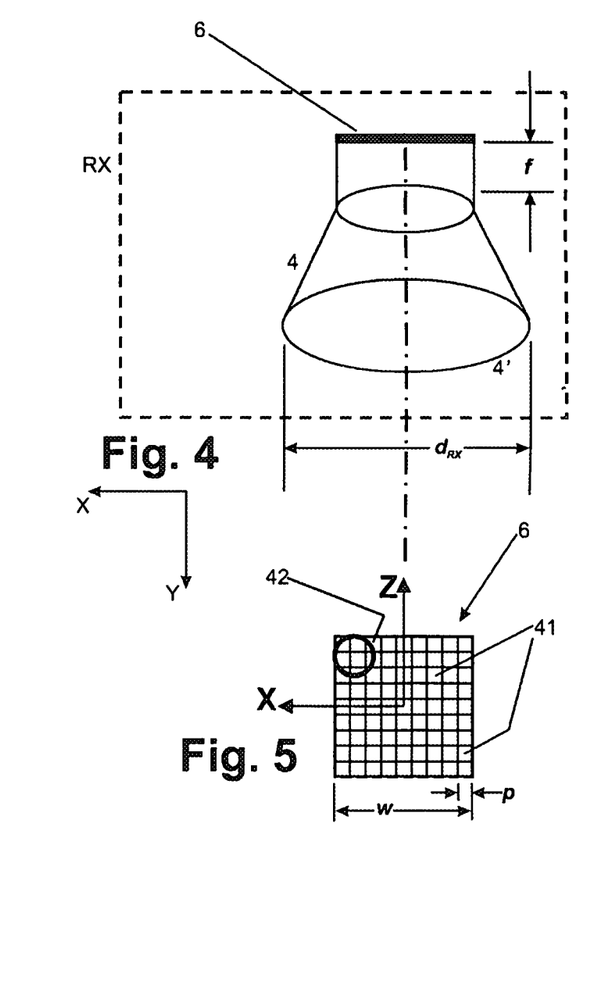
FIG. 4 is a plan like FIGS. 1 and 2 but showing only the reception optics, together with principal dimensional definitions of the reception subsystem.
FIG. 5 is a detailed front elevation, also highly schematic, of the detector that is part of the reception optics.

The lidar system includes an afocal MEMS beamsteering (AMBS) transmitter TX (FIGS. 1, 2 and 4), and a receiver RX. The AMBS transmitter system (hereinafter "AMBS-TX") and the receiver system address a common field of regard ("FOR"), with angular extent $\theta_{FOR}$, about the X and Z axes (FIGS. 3 and 5). More precisely, the angles θ (FIG. 1) that are actually shown represent horizontal angular position $\theta_X$; whereas the orthogonal angles representing vertical angular position $\theta_Z$ are in and out of the plane of the paper.

The AMBS-TX directs a lidar laser beam to a field location of interest, where the beam is reflected by an object 30 if present. The reflected light, if any, is collected by the receiver RX. The location of an object in the X, Y, Z coordinate system relative to the lidar transceiver is determined by measuring distance D to the object and the vertical and horizontal angular positions $\theta_Z$, $\theta_X$ of the laser reflection from the object. Lasers in various embodiments operate either pulsed or CW. Distance to the object is characterized by one or both of two methods:

1) Actual distance as such equals time of flight for pulsed laser light to leave the AMBS-TX and return to the receiver, times the speed of light, divided by two.
2) The first time derivative of the distance is ascertained from observed Doppler shift in amplitude-modulated CW laser-radiation frequency that occurs when the lidar laser radiation is reflected from the object and sensed by the detector.

The latter information is particularly useful when the camera-style lidar setup of our invention is incorporated into or associated with a rendezvous-and-docking system or a collision-avoidance system—whether for spacecraft or automobiles, or otherwise—or any other sort of situation in which it is desired to know speed of approach or speed of recession.

Horizontal and vertical angular positions $\theta_X$, $\theta_Z$ of the object, relative to the AMBS-TX, are determined by one or both of two additional methods:

1) Knowledge of the MEMS scan-mirror angles $\phi_X$ and $\phi_Z$ is related to the projected lidar laser-beam horizontal and vertical angular positions $\theta_X$, $\theta_Z$—based on the MEMS reflection geometry and afocal-lens magnification M. (Here again the actually illustrated angles $\phi$, M$\phi$ [FIG. 1] represent the horizontal angular positions e.g. $\phi_X$; while the orthogonal angles representing vertical angular position $\phi_Z$ are in and out of the plane of the paper.) For simplicity of this document, the afocal magnifier 4 is herein called a "lens assembly" or "lens", but it is to be understood that this afocal element may instead be another type of refractor, or a reflector, or a combination or hybrid refractor/reflector.
2) Knowledge of where in the detector X-Z image plane 6 (FIG. 5), the image 42 of the laser reflection from the object is imaged is related geometrically to the focal length f (FIG. 4) of the receiver lens 4 and the corresponding X, Z object location.

The smallest resolvable angular extent or subtense of the lidar beam 31 about horizontal and vertical angular positions $\theta_X$ and $\theta_Z$ is determined by one of these conditions:

1) the lidar laser beam divergence $\theta_{DIV}$—if $\theta_{DIV} \leq p/f$, where p is the minimum sample size of the receiver detector 6 and f is the focal length of the receiver lens 4; and otherwise
2) p/f (i.e. if $\theta_{DIV} > p/f$).

For a single receiver module, in angular measure the FOR at the receiver $\theta_{FOR}$ is established by the optical relationships (FIG. 5) at the detector:

$$\tan\left(\frac{1}{2}\theta_{FOR\text{-}RX}\right) = \frac{W}{2f},$$

or in other words $$\theta_{FOR\text{-}RX} = 2\arctan\frac{W}{2f}.$$

The lidar system includes the following major elements.
1) The lidar laser 1 operates at a wavelength $\lambda_1$ and is controlled 21 by a central processor 11 to synchronize the laser pulse 34, 35 with the MEMS scan mirror 3—in order to address the desired horizontal and vertical angular positions $\theta_X$ and $\theta_Z$. The scan mirror or array 3 is supported by a substrate 38. The laser beam 34, 35 passes through a beam-expander lens 2 and then a dichroic beamsplitter 8, reflects from the MEMS scan mirror 3 and then passes again 36 through a different part of the splitter 8 and through an afocal lens assembly 4 for transmission 31 to the object 30.
2) The beam expander 2 controls the laser divergence and beam waist at the MEMS scan mirror 3. The option to allow for Gaussian or Rayleigh divergence $\theta_{DIV}$ may be made selectable, allowing for a nearly two-times change in divergence; this is in effect a "zoom" capability:

a. $\theta_{DIV} \sim \dfrac{4\lambda}{\pi d_{MEMS}}$, Gaussian divergence;

b. $\theta_{DIV} \sim \dfrac{2.44\lambda}{\pi d_{MEMS}}$, Rayleigh divergence.

3) The two-axis MEMS scan mirror 3 directs the lidar laser beam about horizontal and vertical angular positions $\theta_X$ and $\theta_Z$. This mirror steers the beam 36 in angle $\phi_{MEMS}$ relative to the optical axis 32.

4) The afocal lens assembly 4 is used to magnify the angular field of regard $\theta_{FOR\text{-}TX}$ (FIG. 1) that can be addressed by the lidar laser beam. The afocal lens assembly magnification M:1 results in a laser horizontal or vertical angular position angle of $M\phi_{MEMS}$. The laser-beam divergence, too, is increased by the angular magnification M—so that beyond the afocal lens assembly 4 the divergence is now:

a. $\theta_{DIV} \sim \dfrac{4M\lambda}{\pi d_{MEMS}}$, Gaussian divergence;

b. $\theta_{DIV} \sim \dfrac{2.44M\lambda}{\pi d_{MEMS}}$, Rayleigh divergence.

Figure 1:
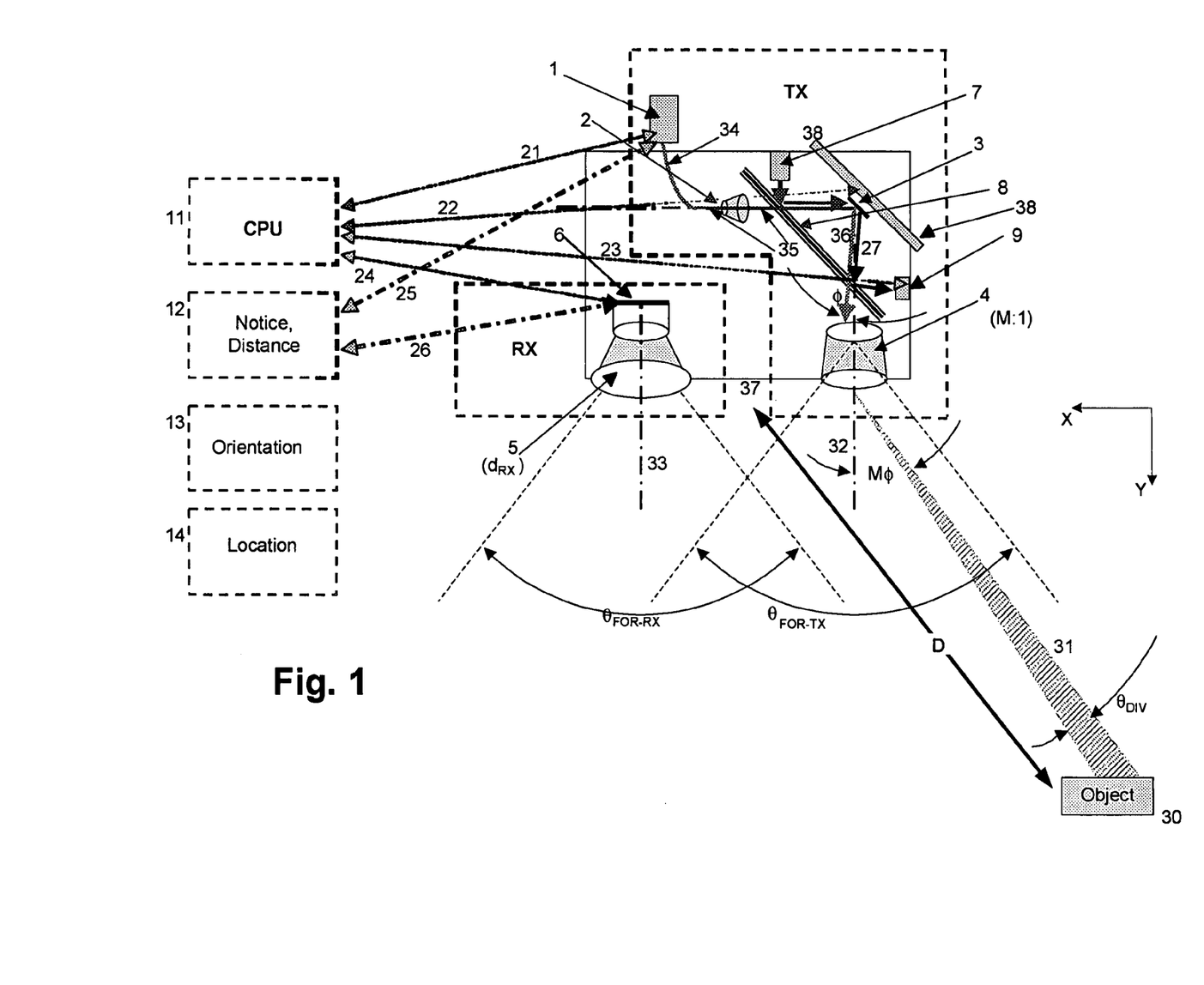
FIG. 1 is a top plan, highly schematic, of the lidar laser-projection and -reception optics, source and detector, including the transmission field of regard ("FOR") and reception FOR, and the outbound optical beams both inside and outside the optical system—as well as an internal auxiliary alignment beam—all integrated with a block diagram of the electronics and other functional modules, conceptually including signals to and from those modules.
Figures 2, 3:
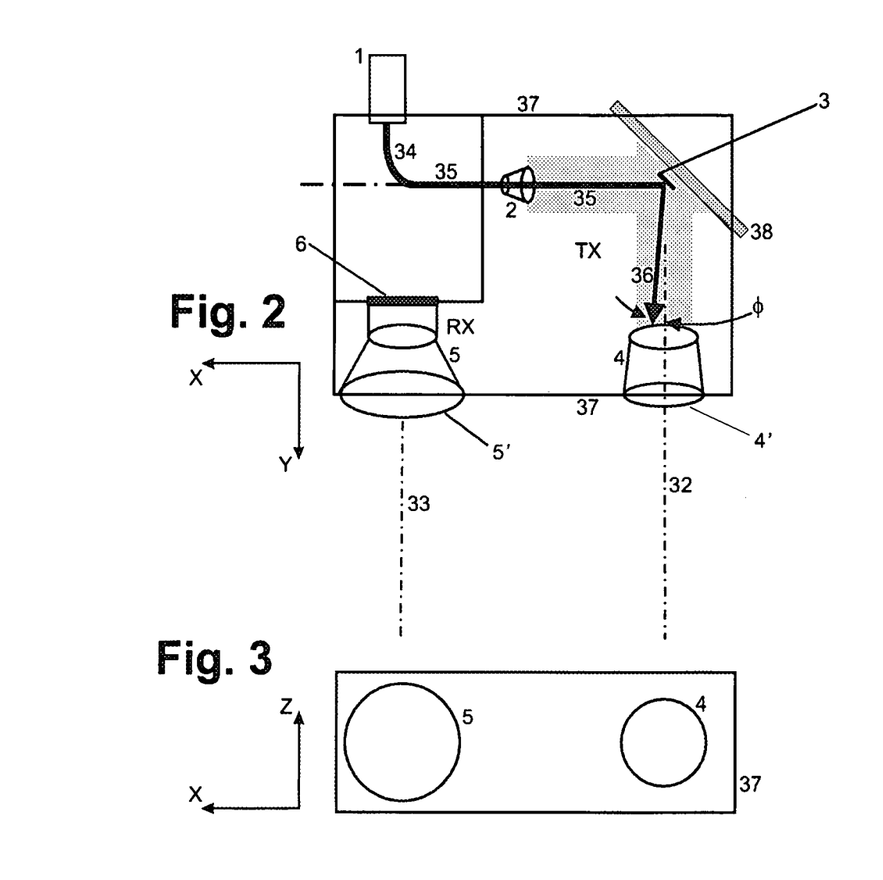
FIG. 2 is a like view of the FIG. 1 optics only, and with the optical paths and fields greatly simplified to show only the main source beam.
FIG. 3 is a front elevation, also highly schematic, of the FIGS. 1 and 2 optics.

5) A receiver lens 5 intercepts returning laser reflection from the object 30—within the receiver field of regard $\theta_{FOR\text{-}RX}$ (most typically centered on an optical axis 33 of the receiver)—and focuses it on the detector 6 (FIGS. 1, 4 and 5).

6) The detector senses the lidar laser beam reflected by the object, and thereby measures the object distance D and relative speed (whether for rendezvous or preventing collision)—based on time of flight or Doppler shift, respectively, as mentioned earlier. When the detector senses the return, the CPU 11 or lidar processor 12 notices the signal and also detects the corresponding MEMS scan angles $\phi_X$ and $\phi_Z$—and thus the field-location angles $\theta_X$ and $\theta_Z$. The detector can be a single unit of dimensions W by W (FIG. 5) or can be composed of multiple subsections of dimensions p by p. Advantageously the detector-unit size is controlled actively, determining the sampled region based on knowledge of where the scan mirror is pointing the laser beam. This allows for addressing/sampling of smaller units—e.g. pixels of interest, a subset of the entire array, as opposed to the entire detector array. Such small-unit sampling lowers the capacitance and resistance associated with the effective detection unit, and thereby provides the highest possible sampling rate.

7) An auxiliary, MEMS-calibration light source 7 operating at $\lambda_2$ reflects at the dichroic beamsplitter 8, to travel along the same path 36 as the lidar laser source 1 operating at $\lambda_1$. After reflection by the MEMS scan mirror, the auxiliary beam 27 is again reflected from the beamsplitter 8 and directed to a two-axis position-sensing detector ("PSD") or any other detector 9 enabling measurement of the MEMS-mirror scan angle $\phi_{MEMS}$.

8) The spatial separation of radiation beams—namely, the separation needed to establish the congruent beam paths 36, 27 within the central optical system but diverging optical paths outside that region—is based upon wavelength discrimination by the dichroic beamsplitter. It transmits the lidar laser beam of one wavelength $\lambda_1$ but reflects the auxiliary calibration beam of a different wavelength $\lambda_2$. Also within the scope of the invention is an alternative configuration in which $\lambda_1$ is reflected and $\lambda_2$ transmitted.

9) The two-axis PSD 9 intercepts the auxiliary beam after reflection by the scan mirror 3. Output signals from the PSD provide information on the MEMS scan angle, and thus the lidar-laser horizontal and vertical angular-position values $\theta_Z$ and $\theta_X$—as well as providing feedback for closed-loop control, of the scan mirror. The scan angle of that mirror can be found from a lookup table ("LUT") based on the known function of angle vs. voltage (or instead vs. current or capacitance, or magnetic state) of the MEMS actuators, or can be found from the built-in optical calibration detailed in paragraphs 7 through 9 above. Alternatively this built-in calibration can be used to construct (or after possible damage or disruption reconstruct) the LUT for subsequent quick reference. Again, the scan-mirror angles $\phi_X$ and $\phi_Z$ and thus (given M) field-location angles $\theta_X$ and $\theta_Z$ can be learned by measuring the voltages or currents applied to the MEMS actuators, or based on capacitance or magnetic-field sensor outputs which relate those properties to the corresponding angles, once such an LUT has been generated. If any of these approaches is used, then for measurement of $\phi_X$ and $\phi_Z$ it is not necessary to include any of the second laser source 7, dichroic mirror/splitter 8, and detector 9.

10) A programmed general-purpose central processor 11 controls 21 pulsing of the laser 1 and also controls and monitors 24 sensitivity of the detector 6, to enable generally synchronous detection—with allowance for the time lags needed in basic lidar operation. The processor 11 also interacts 23 with the PSD 9, and can set 22 the orientation of the mirror substrate panel 38, as one means of presetting the mirror(s) 3 calibration.

11) A secondary, special-purpose lidar processor 12 provides the above-mentioned basic lidar operation, providing precise intersignal timing 25, 26 that enables the apparatus to first:
   a. "notice" receipt of an optical-return signal 26 nominally synchronous with a lidar trigger signal 25 and a corresponding output pulse 34, 31; and then
   b. based on the intersignal timing, determine the "distance" of an object 30 responsible for the return.

12) An orientation and a location module 13, 14 simply enable the system to incorporate its own orientation and location (collectively "disposition") into information read out to human users or for automatic response, as may be the case. Orientation and location may be based on sightings to fixed or known-location stations, followed e.g. by triangulation. If preferred, they may instead be inferred from feedback signals of conventional spinning-mass devices, or location found by a global-positioning unit. These diverse kinds of data source can be mixed and matched as desired. The system can report its raw angular determinations separately from the disposition, for integration elsewhere; however, if preferred the system 11-14 can preintegrate the disposition into the lidar data to produce e.g. geodetic coordinates for the objects noticed by the system.

13) The aperture of the deflecting mirror subsystem 3 is both necessarily and advantageously (for purposes of transmitting a very intense beam that initially is tightly collimated) quite small. Correspondingly the apertures elsewhere in the transmission system TX—particularly including the aperture 4' of the afocal assembly 4—are all also small. For detection purposes, on the other hand, particularly with a weak return, it is desirable to collect as much light as possible. Since the present invention is particularly distinguished by separate (i.e., not shared-aperture) transmission and reception systems TX, RX, it is not necessary in this system to make the receiver aperture 5' the same size as the final transmission aperture 4'. Therefore, merely by way of example, the afocal-lens aperture diameter 4' may be advantageously in the range of 0.1 to 10 mm; while the receiver aperture diameter 5' may be advantageously in the range of 10 to 50 mm. These values vary widely with the application at hand.

For further optimization it is also possible to provide plural receiver modules RX to cover the full FOR of the transmitter TX with its magnifying afocal optical assembly 4.

14) The entire apparatus, including the processor and related modules 11-14, may be housed together in a common case. Alternatively if preferred the transmitter TX and receiver RX units may be held in a smaller case 37 (FIGS. 1 through 3), and the processor etc. modules 11-14 packaged separately—with the signal links 21-26 provided by e.g. radio signals or cabling. As will be understood, these choices are a matter of economic constraints, convenience, or requirements imposed by size and weight limitations for the application at hand.

When searching for a source location, the system can simply determine the "point" (i.e., focused spot) location directly if the laser-beam divergence is smaller than the receiver per-pixel FOV ("PPFOV"). If it is not, then for better angular measurement the system can fit to the centroid of the return. It will be understood that most commonly the interest is not in the shape as such, but rather only in using it as a means for improving position accuracy.

An advantageous variant configuration of the invention includes an additional receiver 105 (FIGS. 6 and 7), with its own respective optical axis 105' and imaging detector 106. Preferably one of the two RX units 5, 105 is particularly sensitive at the wavelength or wavelengths emitted by the laser 1, for use in a lidar, or "active", mode to measure the distance of noticed objects.

Figure 6:
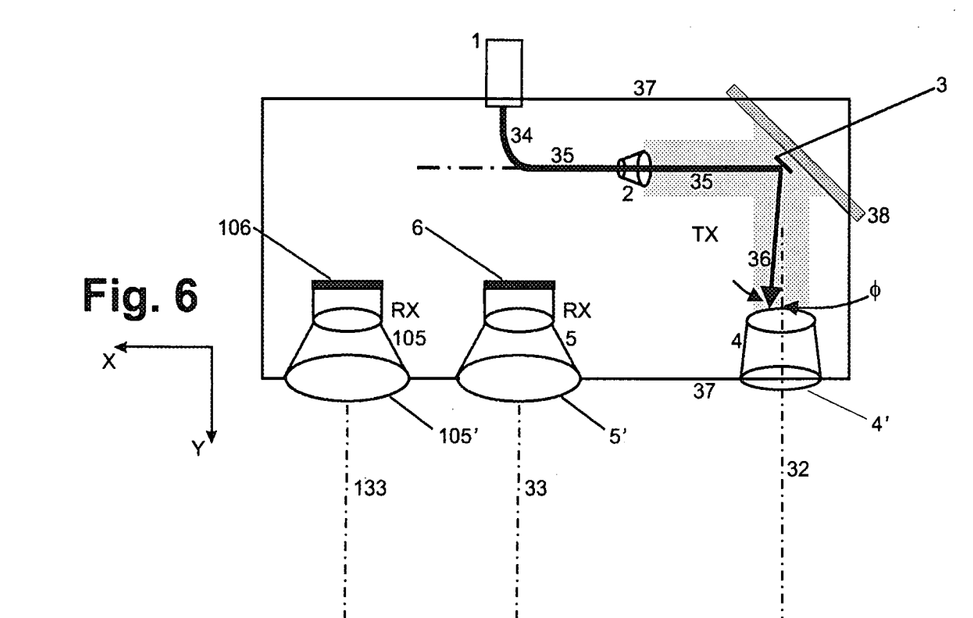
FIGS. 6 and 7 are views like FIGS. 2 and 3, respectively, but with an additional receiver included in the system for purposes to be described below.
Figure 7:
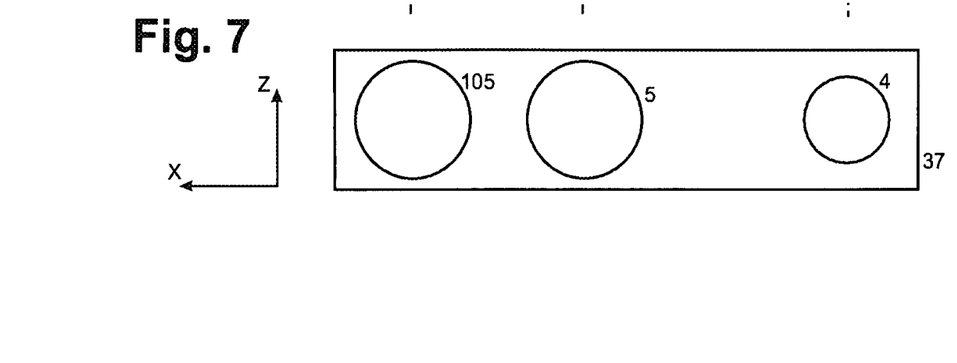

The other of the two RX units is for use in a "passive", or nonlidar, mode for noticing self-luminous objects—i.e., radiation sources—and accordingly is sensitive over a wavelength band in which such sources are generally expected to be emitting. Either or both receivers may be adapted for certain kinds of wavelength measurements too, so that they can be used for Doppler measurements to measure the speed of the noticed device.

Thus with the dual-receiver form of the invention, the system can first notice 71 (FIG. 9) a remote source by passive detection at the passive-mode receiver, and analyze the corresponding image position on the detector plane to locate 72 the source in the field domain. Given that location, the system can then reply 73 with a pulse of light from laser 1, returned to that source location.

Figure 9:
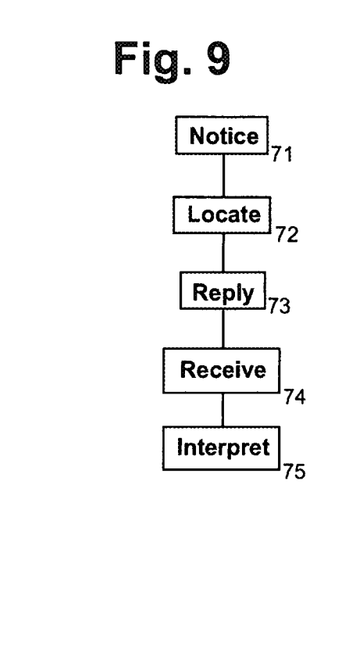
FIG. 9 is a flow chart particularly related to some functions of the dual-receiver configuration of FIGS. 6 and 7.

If an object at the source reflects the reply pulse, the system can then receive 74 the reflected pulse at the active-mode receiver, and based upon timing relative to the outgoing laser pulse can interpret 75 the relationships to measure the source-object distance. As an alternative, or in addition, to lidar measurement the outgoing pulse can be caused to amplitude-overload optical equipment or personnel, or otherwise to jam operations, at the source—but this would not normally be appropriate in use of the invention for collision avoidance or docking.

An individual MEMS mirror conventionally has a rest position 63 (FIG. 8) that is generally parallel to the backplane 38 of the mirror or array. By operation of electrically driven conventional actuators, not shown, each mirror undergoes rotation 64 (within the plane of the drawing, and also other rotation not shown that is in and out of the drawing plane) to rotated positions e.g. 63'.

Figure 8:
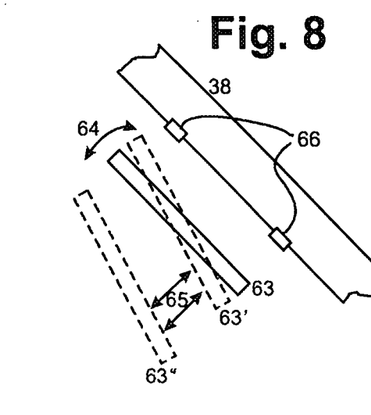
FIG. 8 is a plan like FIGS. 1, 2, 6 and 7 but highly schematic and very greatly enlarged—and showing only the mirror back-plate and a single representative mirror, in some of its various motions.

In preferred embodiments of our invention, each mirror also undergoes independent translation 65 in a so-called "piston" direction to adopt dispositions e.g. 63". The magnitudes and directions of these motions can be determined from the voltage and current directed to the actuators, and as noted earlier these drive signals can be calibrated and the calibration memorized in a lookup table so that the deflections and corresponding field positions at each moment can be found automatically by finding their instantaneous values in the table.

An alternative technique for rapid determination of the mirror disposition is to measure it with calibrated sensors 66. These can be capacitive, magnetic, optical, acoustic etc.

Figure 10:
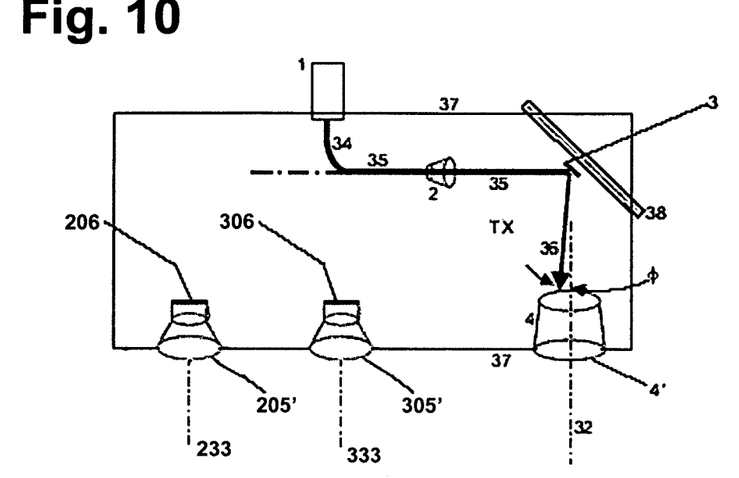
FIG. 10 is a plan like FIG. 6 but for a variant.

As detailed above, some preferred embodiments of our invention have receiver-aperture area that is individually larger than the transmitter-aperture area. In a variant preferred configuration, individual receiver-apertures 205' (FIG. 10), 305' have respective aperture areas individually smaller—but in the aggregate larger—than the transmitter-aperture area 4. As will be understood by people of ordinary skill in this field, the plural receiver apertures 205', 305' can be multiple apertures, i.e. three, four or more apertures.

The foregoing descriptions are intended to be, and are, merely exemplary, not to limit the scope of the invention—which is to be determined solely by reference to the appended claims.

We claim:

1. A lidar apparatus comprising:
a lidar transmitter that includes a laser source that produces a laser beam, a scan mirror or scan-mirror assembly angularly adjustable to deflect the beam in at least two orthogonal directions, and an afocal optical unit for magnifying the beam deflection;
said transmitter having an aperture for transmitting the beam;
a lidar receiver that does not share the transmitter aperture; wherein:
the receiver comprises plural separate discrete receiver modules, each having an aperture whose area is individually smaller than the area of the transmitter aperture, and each being either:
a CCD array, or
an individual photodetector not integrated with other photodetectors into an array; and
aggregate aperture area of the plural receiver modules is larger than the area of the transmitter aperture;
a beam expander, disposed between the laser and the mirror or mirrors, for controlling the beam waist or divergence, or both, particularly at the mirror or mirrors; and
means for effectively providing a "zoom" function; wherein the effectively-providing means in turn comprise:
means for causing the expander to be adjustable, and
means, controlled by adjusting the expander, for enabling selection of Gaussian or Rayleigh divergence.

2. A lidar apparatus comprising:
a lidar transmitter that includes a laser source that produces a laser beam, a scan mirror or scan-mirror assembly angularly adjustable to deflect the beam in at least two orthogonal directions, and an afocal optical unit for magnifying the beam deflection;

said transmitter having an aperture for transmitting the
beam;
a lidar receiver that does not share the transmitter aperture;
wherein:
the receiver comprises plural separate discrete receiver
modules, each having an aperture whose area is individually smaller than the area of the transmitter aperture,
and each being either:
a CCD array, or
an individual photodetector not integrated with other
photodetectors into an array; and
aggregate aperture area of the plural receiver modules is
larger than the area of the transmitter aperture; and
an auxiliary optical system for calibrating the deflection
produced by the mirror or mirror assembly; wherein:
the laser beam follows a particular optical path at the
mirror or mirrors; and
the auxiliary optical system comprises:
means for causing an auxiliary radiation beam to follow,
at the mirror or mirrors, an optical path identical or
similar to the particular path, and
means for monitoring deflection of the auxiliary beam
by the mirror or mirrors; and
the causing means comprise a beamsplitter for at least
roughly aligning the auxiliary beam with the laser
beam in approaching the mirror or mirrors.

3. The apparatus of claim 2, further comprising:
means for separating the auxiliary beam from the laser
beam after leaving the mirror or mirrors;
an auxiliary detector for determining deflection of the
separated auxiliary beam by the mirror or mirrors; and
means for correlating the determined deflection with control signals that operate the mirror or mirrors; and
wherein:
the separating means comprise means for passing the auxiliary beam through the same beamsplitter again or
through another beamsplitter.

4. The apparatus of claim 3, wherein:
the auxiliary detector is a position-sensing detector
("PSD").

5. The apparatus of claim 2, wherein:
the beamsplitter is wavelength sensitive; and
the auxiliary beam and laser beam are of different wavelengths; and
the beamsplitter is a dichroic element or holographic element.

6. The apparatus of claim 2, further comprising: means for
at least roughly synchronizing pulses of the laser beam with
sensitive times or dispositions, or both, of the receiver.

7. A lidar apparatus comprising:
a lidar transmitter that includes a laser source that produces
a laser beam, a scan mirror or scan-mirror assembly
angularly adjustable to deflect the beam in at least two
orthogonal directions, and an afocal optical unit for
magnifying the beam deflection;
said transmitter having an aperture for transmitting the
beam; and
a lidar receiver that does not share the transmitter aperture;
wherein:
the receiver comprises plural separate discrete receiver
modules, each having an aperture whose area is individually smaller than the area of the transmitter aperture,
and each being either:
a CCD array, or
an individual photodetector not integrated with other
photodetectors into an array; and
aggregate aperture area of the plural receiver modules is
larger than the area of the transmitter aperture; and further comprising one or both of:
calculating means for determining time delay between
transmission of a pulse of the laser beam and receipt of
a reflected return of the pulse from an object; and
comparison means for determining Doppler shift in the
laser beam;
wherein the calculating or comparison means further comprise, respectively:
means for calculating object distance from the determined time delay, or
means for deriving relative speed from the shift; and
still further comprising means for incorporating information about the apparatus orientation or location, or both,
together with information that the apparatus has noticed
a return from an object, or distance of such an object, or
both.

8. A lidar apparatus comprising:
a lidar transmitter that includes a laser source that produces
a laser beam, a scan mirror or scan-mirror assembly
angularly adjustable to deflect the beam in at least two
orthogonal directions, and an afocal optical unit for
magnifying the beam deflection;
said transmitter having an aperture for transmitting the
beam; and
a lidar receiver that does not share the transmitter aperture;
wherein:
the receiver comprises plural separate discrete receiver
modules, each having an aperture whose area is individually smaller than the area of the transmitter aperture,
and each being either:
a CCD array, or
an individual photodetector not integrated with other
photodetectors into an array; and
aggregate aperture area of the plural receiver modules is
larger than the area of the transmitter aperture;
the receiver has a detector of particular overall dimensions,
and is controlled actively to select operation as either:
a single unit having said particular overall dimensions,
or
multiple subsections of the detector, each having dimensions smaller than said particular overall dimensions;
and
a sampled region is selected based on knowledge of where
the scan mirror is pointing the laser beam, to facilitate
sampling of smaller units.

9. A method for noticing for and responding to a remote
light source, said method utilizing a transmitter which
includes a local radiation source that produces a laser beam, a
scan mirror or scan-mirror assembly angularly adjustable to
deflect the beam in at least two orthogonal directions, and an
afocal optical unit for magnifying the beam deflection, said
transmitter having an aperture for transmitting the beam; and
a radiation receiver that does not share the transmitter aperture, and an additional receiver; said method comprising the
steps of:
operating the first-mentioned receiver to notice and determine a location of the remote source;
controlling the transmitter to direct the laser beam back
toward the determined location; and
activating the additional receiver to collect and interpret
reflected radiation of the back-directed laser beam,
received from the location;
wherein the first-mentioned receiver and the additional
receiver are sensitive in respective different wavelength
bands, namely:

a first spectral waveband encompassing emissions of expected remote sources including but not necessarily limited to said remote light source; and a second spectral waveband encompassing said laser beam.

10. A method for noticing and responding to a remote light source, said method utilizing a transmitter which includes a local radiation source that produces a laser beam, a scan mirror or scan-mirror assembly angularly adjustable to deflect the beam in at least two orthogonal directions, and an afocal optical unit for magnifying the beam deflection, said transmitter having an aperture for transmitting the beam; and a radiation receiver that does not share the transmitter aperture; further utilizing an additional receiver; said method comprising the steps of:

operating the receiver to notice and determine a location of the remote source; and controlling the transmitter to direct the laser beam back toward the determined location;

activating the additional receiver to collect and interpret reflected radiation of the back-directed laser beam, received from the location;

wherein the activating step comprises using the additional receiver in a lidar operating mode to determine return time of the laser beam and thereby distance of a reflecting object at the location.

11. A method for noticing and responding to a remote light source, said method utilizing a transmitter which includes a local radiation source that produces a laser beam, a scan mirror or scan-mirror assembly angularly adjustable to deflect the beam in at least two orthogonal directions, and an afocal optical unit for magnifying the beam deflection, said transmitter having an aperture for transmitting the beam; and a radiation receiver that does not share the transmitter aperture; said method comprising the steps of:

operating the receiver to notice and determine a location of the remote source; and controlling the transmitter to direct the laser beam back toward the determined location;

wherein the operating step comprises:

fitting the centroid of an incoming radiation pattern to an expected shape, when the laser-beam divergence exceeds the per-pixel FOV.

12. A lidar apparatus comprising:

a lidar transmitter that includes a laser source that produces a laser beam, a scan mirror or scan-mirror assembly angularly adjustable to deflect the beam in at least two orthogonal directions, and an afocal optical unit for magnifying the beam deflection;

said transmitter having an aperture for transmitting the beam; and a lidar receiver that does not share the transmitter aperture;

a beam expander, disposed between the laser and the mirror or mirrors, for controlling the beam waist or divergence, or both, particularly at the mirror or mirrors; and means for effectively providing a zoom function; wherein the effectively-providing means in turn comprise:

means for causing the expander to be adjustable, and means, controlled by adjusting the expander, for enabling selection of Gaussian or Rayleigh divergence.

13. A lidar apparatus comprising:

a lidar transmitter that includes a laser source that produces a laser beam, a scan mirror or scan-mirror assembly angularly adjustable to deflect the beam in at least two orthogonal directions, and an afocal optical unit for magnifying the beam deflection;

said transmitter having an aperture for transmitting the beam; and a lidar receiver that does not share the transmitter aperture;

an auxiliary optical system for calibrating the deflection produced by the mirror or mirror assembly; wherein:

the laser beam follows a particular optical path at the mirror or mirrors; and the auxiliary optical system comprises:

means for causing an auxiliary radiation beam to follow, at the mirror or mirrors, an optical path identical or similar to the particular path, and means for monitoring deflection of the auxiliary beam by the mirror or mirrors; and the causing means comprise a beamsplitter for at least roughly aligning the auxiliary beam with the laser beam in approaching the mirror or mirrors.

14. The apparatus of claim 13, further comprising:

means for separating the auxiliary beam from the laser beam after leaving the mirror or mirrors;

an auxiliary detector for determining deflection of the separated auxiliary beam by the mirror or mirrors; and means for correlating the determined deflection with control signals that operate the mirror or mirrors; and wherein:

the separating means comprise means for passing the auxiliary beam through the same beamsplitter again or through another beamsplitter.

15. The apparatus of claim 14, wherein:

the auxiliary detector is a position-sensing detector ("PSD").

16. The apparatus of claim 13, wherein:

the beamsplitter is wavelength sensitive; and the auxiliary beam and laser beam are of different wavelengths; and the beamsplitter is a dichroic element or holographic element.

17. The apparatus of claim 13, further comprising:

means for at least roughly synchronizing pulses of the laser beam with sensitive times or dispositions, or both, of the receiver.

18. The apparatus of claim 13, further comprising one or both of:

calculating means for determining time delay between transmission of a pulse of the laser beam and receipt of a reflected return of the pulse from an object; and comparison means for determining Doppler shift in the laser beam;

wherein the calculating or comparison means further comprise, respectively:

means for calculating object distance from the determined time delay, or means for deriving relative speed from the shift; and still further comprising means for incorporating information about the apparatus orientation or location, or both, together with information that the apparatus has noticed a return from an object, or distance of such an object, or both.

19. The apparatus of claim 13, wherein:

the receiver has a detector of particular overall dimensions, and is controlled actively to select operation as either:

a single unit having said particular overall dimensions, or multiple subsections of the detector, each having dimensions smaller than said particular overall dimensions; and a sampled region is selected based on knowledge of where the scan mirror is pointing the laser beam, to facilitate sampling of smaller units.

20. A lidar apparatus comprising:
- a lidar transmitter that includes a laser source that produces a laser beam, a scan mirror or scan-mirror assembly angularly adjustable to deflect the beam in at least two orthogonal directions, and an afocal optical unit for magnifying the beam deflection of the laser beam;
- wherein the afocal optical unit is positioned to operate on the laser beam only before transmission by the lidar transmitter and after the laser beam has been deflected by the scan mirror or scan-mirror assembly;
- said lidar transmitter having a transmitter aperture for transmitting the laser beam; and
- a lidar receiver that does not share the lidar transmitter aperture.

* * * * *

UNITED STATES PATENT AND TRADEMARK OFFICE
CERTIFICATE OF CORRECTION

| | | |
|---|---|---|
| PATENT NO. | : 8,958,057 B2 | Page 1 of 1 |
| APPLICATION NO. | : 12/317771 | |
| DATED | : February 17, 2015 | |
| INVENTOR(S) | : David M. Kane, Jeff T. Daiker and James T. Murray | |

It is certified that error appears in the above-identified patent and that said Letters Patent is hereby corrected as shown below:

In the Specification

Column 1, lines 23-26, insert the following:

--STATEMENT OF GOVERNMENT SUPPORT:
This invention was made with government support under contract W911QX-04-C-0024 awarded by the Department of the Army. The government has certain rights in the invention.--

Signed and Sealed this
Fourteenth Day of July, 2015

Michelle K. Lee
*Director of the United States Patent and Trademark Office*